OUTPUT CONVERTERS FOR DIGITAL COMPUTERS

Filed Sept. 12, 1957 3 Sheets-Sheet 1

Inventors
R. J. Froggatt
N. D. Robinson
By Glascock Downing & Seebold
Attys.

Inventors
R. J. Froggatt
N. D. Robinson
By Hascock Downing & Seebold
Attys

Inventors
R. J. Froggatt
N. D. Robinson
By Glascock Downing & Seebold
Attys.

United States Patent Office 3,000,562
Patented Sept. 19, 1961

3,000,562
OUTPUT CONVERTERS FOR DIGITAL COMPUTERS

Robert Justin Froggatt, Norwood Green, Southall, and Nigel David Robinson, Hillingdon, England, assignors to Electric & Musical Industries Limited, Hayes, Middlesex, England, a company of Great Britain
Filed Sept. 12, 1957, Ser. No. 683,527
Claims priority, application Great Britain Sept. 15, 1956
4 Claims. (Cl. 235—155)

This invention relates to output converters for digital computers.

In some output converters for digital computers where an output from an intermediate section or final section of a computing machine, is presented as a number coded in serial binary form it is required to reconvert the coded number to a particular scale of units. For example, if data representing sterling, pounds, shillings and pence, is fed into the machine it may be required of the machine to provide an answer in binary words representing each character on a sterling scale, suitable for printing out. A usual form for printing out may be on punched cards.

One type of output converter comprises essentially a store, preferably a magnetic drum store, on which are stored in binary digital form, equivalents on one or more scales, for example sterling or binary decimal scales and means for reading off these equivalents serially in response to the presence of digits "1" in a serial binary coded number presented to the converter. Clearly, adding means must be provided for the successive binary equivalents and difficulty may be encountered in providing "carries" in this type of addition, since it is usually necessary to add "fillers" to each character of an equivalent when a "carry" is required. The nature of the fillers will be apparent from the following description of the invention.

The object of the present invention is to provide improved means for instrumenting "carries" in output converters.

According to the present invention there is provided digital conversion apparatus comprising a first store for signals representing a serial binary number to be converted to another scale of notation, a second store for equivalents in said other scale of possible bits in said serial binary number added to each of which are appropriate fillers according to said other scale of notation, gating means responsive to signals derived from said first store for selectively deriving signals representing corresponding equivalents and fillers from said second store, serial binary adding means for adding said signals to previously converted signals stored in a third store and means for selectively subtracting said fillers in the dependence upon the occurrence of carries in predetermined positions in the resultant produced by said adding means.

Figure 1:
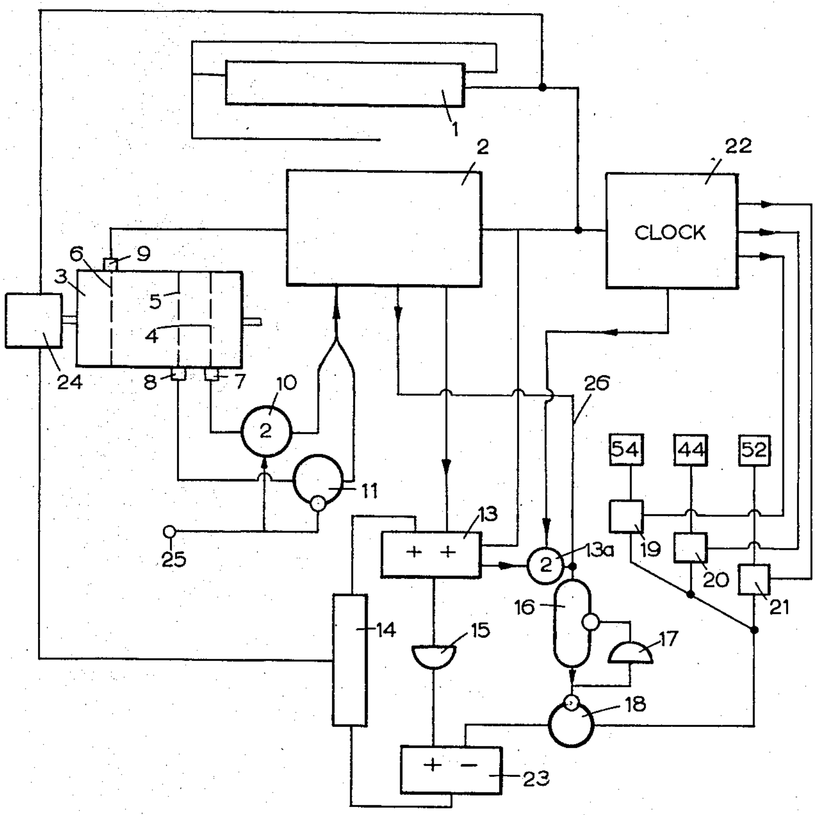
Figure 2:
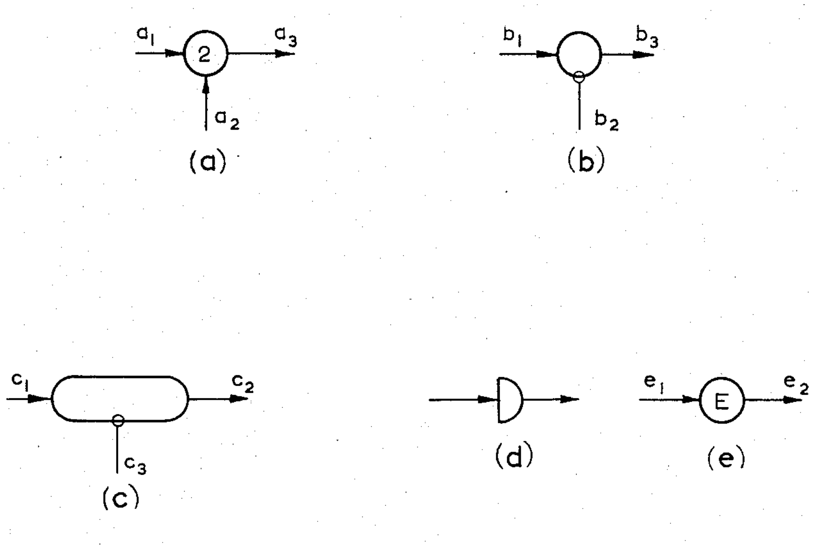
Figure 4:
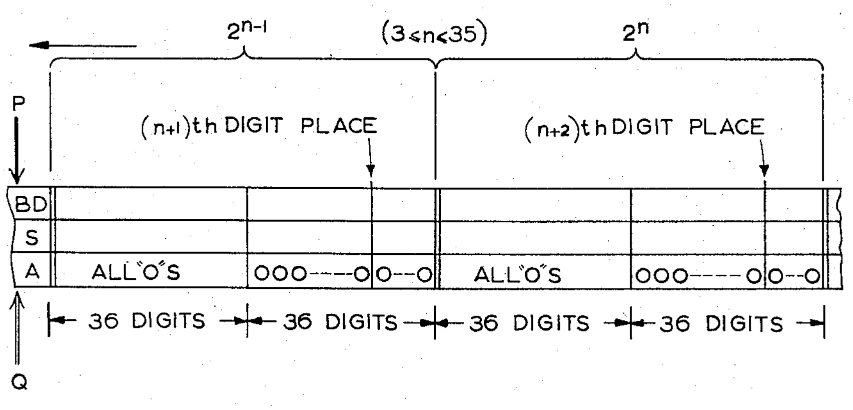
Figure 3:
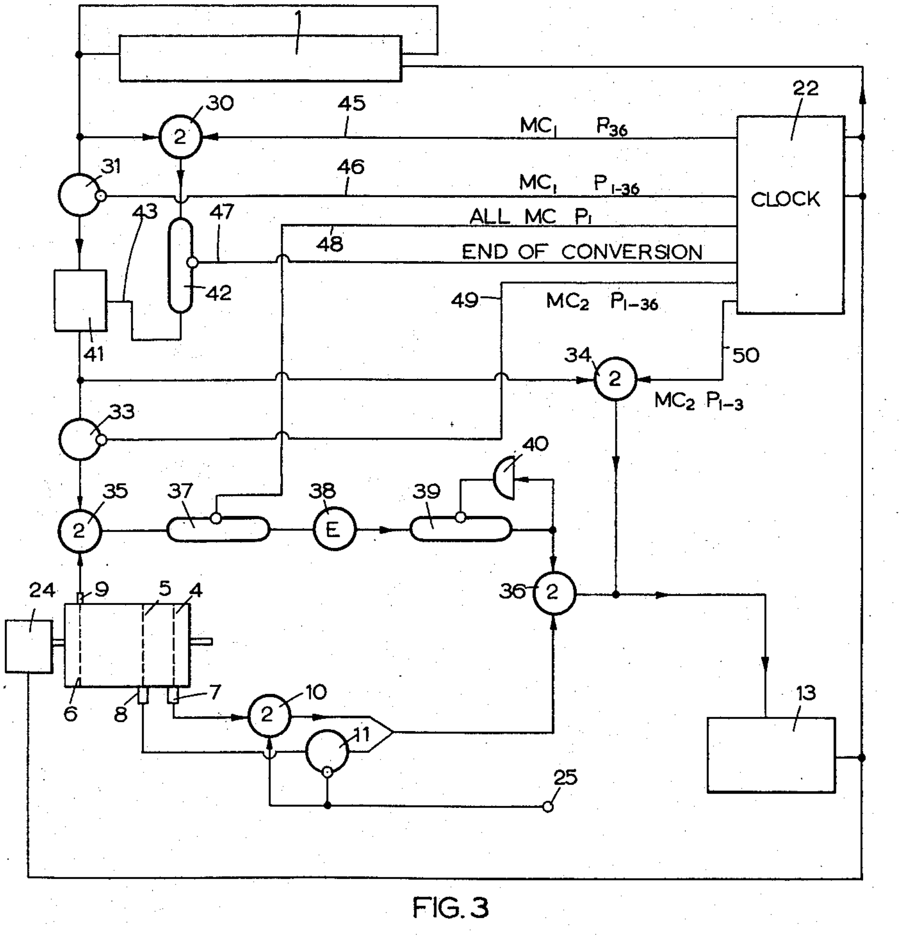

In order that the invention may be clearly understood and readily carried into effect, the invention will be described with reference to the accompanying drawings, in which:

FIGURE 1 illustrates diagrammatically and mainly in block form, one example of an output converter according to the invention, FIGURE 2 illustrates symbols used in FIGURE 1 to represent conventional circuit units in order to simplify description thereof, FIGURE 3 illustrates in detail the construction of one block shown in FIGURE 1, and FIGURE 4 illustrates the arrangement of a fragment of a drum store used in FIGURE 1.

Referring to FIGURE 2, symbol (*a*) denotes a pulse gate having input connections *a*1 and *a*2 and an output connection *a*3. The figure enclosed in the symbol denotes the threshold of the gate, the figure being 2 in the example illustrated, thereby indicating that it would require the simultaneous application of pulses to two input connections to produce the single output pulse. A suitable form of pulse gate is described in the "Proceedings of the I.R.E.," May 1950, page 511.

Symbol (*b*) denotes a pulse inhibitor gate having a normal input connection *b*1, an inhibit input connection *b*2 and an output connection *b*3. A pulse applied to *b*2 inhibits the transmission of pulses from *b*1 to *b*3. A pulse inhibitor gate may be of similar construction to a pulse gate such as represented by (*a*), with however, one of the controls reversed.

Symbol (*c*) denotes a two state device having an input connection C1, and output connection C2 and an inhibitor connection C3. When the device is in one state, the state "0," a signal on the connection C1 changes the device to the state "1," the device remaining in that state until a signal is applied to the inhibitor connection C3 whereupon the device reverts to state "0." In state "1" of the device, the output connection C2 is energised. A two-state device such as indicated by symbol (*c*) can be realised by means of an Eccles-Jordan circuit.

Symbol (*d*) denotes a delay element, many forms of which are known in the art.

Symbol (*e*) denotes an end-of-pulse gate which produces a short pulse on an output connection *e*2 at the end of a pulse applied to the input connection *e*1. An end-of-pulse gate may consist for example, of a differentiating circuit followed by a diode limiter to remove one of the pulses produced on differentiating the input.

The theory of the use of fillers is described in detail in an article entitled "Serial digital adders for a variable radix of notation," page 410, "Electronic Engineering" October 1953. However the principle may be understood from the following considerations, in which reference will be made to FIGURE 1 which is to be described in greater detail after a picture of its required function has been presented. The circulation store 1 contains a series of 36 bits in increasing order of signals, the bit of highest significance representing sign. The drum store 3 carries equivalents of successive possible bits stored in 1. Each equivalent is made up of twelve characters each made up of six bits so that since the machine is synchronized throughout to operate in a bit by bit manner, a period of two complete cycles of the store 1, that is 72 bit periods, are ordinarily required to read out from the drum store an equivalent of a single bit in the store 1. Let it be assumed that the required conversion is from binary to binary decimal, that is each bit in the store 1 is to be examined successively and converted into twelve six bit decimal characters, these characters are fed successively bit by bit into an adding unit (which in FIGURE 1 is 13) to be added to previous conversion held in a circulating store 14.

The circulating store is capable of storing a complete conversion of the serial binary word stored in 1. Let it also be assumed for simplicity that a bit in the eighth bit place, in the store 1, is to be converted into binary decimal notation form namely 128. And, suppose further that 127 is held in the output store 14 by virtue of previous conversions, the required number to be stored in 14 is therefore 127+128=255 which if six-bit characters are used in binary decimal form is

000010000101000101 where is it understood that this comprises three six-bit characters read serially.

If the addition is now performed as it is by the serial adder 13, the following is obtained on addition the first pair of characters namely 7 and 8:

000111+001000=001111 and ordinarily this is what would be fed to the store 14 for the addition in that particular character position. But 7+8=15 so that what is required on the binary decimal scale of notation is 1,000101 the digit of highest significance, 1 representing a carry from this character position to the next. In order to produce this it is necessary at some stage to introduce an additional quantity, namely 1,000000—001010 or 110110 and this quantity it known as the "filler." This quantity must only be added moreover when a carry is required and in order to achieve this in the arrangement of FIGURE 1, to each character of the equivalents stored in 3, whether they be zero or not a "filler" is added and if no carry from one character to the next is produced the appropriate filler is subtracted by the serial subtraction unit 23. Since the criteria for requirement of a filler are identical for each character on the binary-decimal scale, the filler which is added to each character is the same, namely 110110. There is of course a possibility of six carries occurring within a particular character but only the carry of highest significance must be selected as a criterion to determine whether the filler must be removed or not from the particular character in question. In order to provide for this the carry signal is gated out every sixth bit and a delay of six digits is provided between the serial adding circuit 13 and the serial subtraction circuit 23 to enable subtraction of the filler to be inhibited if a carry signal is present. The filler for subtraction purposes is stored in a circulating store.

In the case of other scales of notation to which conversion may be required, such for example as sterling, different fillers namely 52 and 44 are required in the production of the respective carries from pence to shillings, and shillings to pounds but binary decimal fillers again operate of course for the successive characters representing pounds.

Referring to FIGURE 1, reference 1 is a rectangle which as mentioned above denotes a circulating store which carries a serial binary-coded number which it is required to convert into a form suitable for printing out. The "word" stored in 1 consists of thirty-six bits, one of these bits, in this case the bit of greatest significance, is used to represent the sign of the quantity stored. A bit "1" represents a negative sign and a bit "0" represents a positive sign. The thirty-six bits appear serially at the output terminal of the store with a frequency which depends upon the cyclic period for the store. The serial digital output from the store is fed into a gating device which for simplicity is represented by the block 2 but is described in detail hereafter with reference to FIGURES 3 and 4. Moreover block 2 also contains a complementer which is responsive to a signal indicating a negative sign. Further circuit means is also provided in 2 which provides that in the event of a bit position in the store 1 to be read out yielding a signal representing an "0" a pulse is provided in the output lead 26 as a result of read out at that digit position. The purpose of this pulse will become clear hereafter. Reference 3 as mentioned above denotes a magnetic drum store upon which are stored groups of seventy-two bits each group comprising twelve six-bit characters representing numbers on sterling and binary-decimal scales respectively, and to each character stored in 3 an appropriate filler is added. These quantities are stored on tracks 4 and 5 respectively but clearly if required further tracks may be included to carry further equivalents with appropriate fillers on different scales of conversion. As will become clear, equivalents of the first three bits stored in the circulating store 1 are not necessary and are not provided. An auxiliary track 6 which operates in conjunction with the gating devices 2 and whose purpose is the selection of successive digits from the store 1, being more fully described with reference to FIGURE 3, is also provided on the drum. The drum is driven by motor 24. The respective drum storage tracks are read by readers 7, 8 and 9, whose outputs are communicated via the pulse gate 10, inhibitor gate 11 and directly, respectively to 2. The output from 2 is connected to a binary adding unit 13 where addition to the quantity already accumulated in a circulating accumulator 14 takes place. The summed output from 13 is delayed by six digit periods in the delay unit 15 and if a carry pulse has occurred in 13 and is indicated by an input from 13 to the two-gate 13*a*, coincident with a clock pulse at the second input to 13*a* which occurs at every sixth bit so that the bistable element 16 receives an input pulse whence 16 is set to its energised state. The purpose of the gate 13*a* is to prevent other carries than are in the sixth digit position in each character from producing a pulse at the input of 16. The output of 16 is connected via a delay element 17 to its own inhibitor connection and also to the inhibitor connection of the gate 18. The input of 18 is connected to electronic switches which are threshold 2 gates such as mentioned above, denoted by rectangles 19, 20, 21 which are instrumental in response to timing pulses from the conventional clock pulse device 22, to provide in binary coded form quantities equal to the required "fillers." Fillers 54, 44 and 52 are indicated being appropriate to pounds, shillings and pence respectively, the filler 54 being used for binary decimal conversion. These are stored in circulating stores denoted by the respective blocks in the figure. The output of 18 is connected to the negative input of a subtracting unit 23 which derives its positive input from the delay output of 15 and the difference output of 23 is connected back to the accumulator 14 where it continues to circulate. Synchronism between the store 1 the motor 24 which drives the drum store and the accumulator 14 is provided by clock pulse connections to 22.

Referring to FIGURE 3, which illustrates in detail the form and operation of the gating device 2 of FIGURE 1 those components which are identical with those of FIGURE 1 have the same references. The output of the circulating store is connected to one input connection for the pulse gate 30 and to the normal input of the pulse inhibitor gate 31 whose output is connected via the complementer 41 to a further inhibitor gate 33 and to an input of the pulse gate 34. A suitable form of complementer would consist of an inhibit gate operated in response to the output of register 1 so that "0's" and "1's" are interchanged, followed by an adder such as shown in "Calculating Instruments and Machines" by D. R. Hartry on pages 100 and 104. The outputs from the drum readers 7 and 8, are communicated via pulse gate 10 and the inhibitor gate 11 to a further pulse gate 36. The output from 35 constitutes the normal input for a two-state device 37 the output of which is connected to an "end-of-pulse" gate 38. The inhibitor connection for 37 receives clock pulses at the beginning of each minor cycle. The output of 38 forms the normal input for a further two-state device 39. The inhibitor connection for 39 is connected via a suitable delay device 40 to its output which constitutes the other input for the pulse gate 36. The device 40 has a delay of 72 bit periods since in this case, each equivalent stored on the drum store 3 is composed of twelve six-bit characters. The output of 36 passes along with the output of 34 to the adder 13.

It will be considered that one complete cycle of the store 1 constitutes a minor cycle two minor cycles being required for conversion for each bit in this store and synchronism between 1 and 24 being provided in known manner by clock pulses from the master clock 22. The clock also provides clock pulses in leads 45, 46, 47, 48, 49 and 50. A clock pulse is applied in 45 at the thirty-sixth bit of the first minor cycle of a conversion and an inhibit input is present for 31 in 46 throughout the first minor cycle. An inhibitor pulse is also applied to 47 at the finish of each conversion and to 48 at the commencement of each minor cycle. The lead 49 carries an inhibitor potential during the whole of the second minor cycle of a conversion and 50 carries a gating potential during the first three bit periods of the second minor cycle. These clock signals are indicated on the respective leads in FIGURE 3, M.C. with suffix indicating which minor cycle is concerned and P with its suffix indicating the periods of that minor cycle.

In FIGURE 4, the fragment of the drum store shown extends over the stored equivalents of two serial binary digits indicated as $2^{n-1}$ and $2^n$. It is assumed that two alternative scales for the equivalents are given, binary decimal (B.D.) or sterling (S). The track indicated by (A) is the above-mentioned auxiliary track. The drum passes in the direction of the arrow and the equivalents are read off by the reader 7 and the bits stored on the auxiliary track are read non-destructively off by the reader 9. Each equivalent comprises a possible twelve characters composed of six bits each. This equivalent therefore to two "words" for each equivalent, each word comprising thirty-six bits or one minor cycle. On the auxiliary track, corresponding to bits comprising the first word of each equivalent, are stored thirty-six 0's but corresponding to the second "word" of each equivalent a single "1" is stored, the position of the "1" in this "word" corresponding to the position of the next bit in the circulating store to be converted. Hence on the second "word" of the portion of the auxiliary track which corresponds to the equivalent of $2^{n-1}$ a "1" is stored in the $(n+1)$th bit position to correspond to the equivalent of $2^n$ which is next to be read off. In the second word of the next portion shown of the auxiliary track a "1" is stored in the $(n+2)$th bit position as shown and so on.

In operation of FIGURE 3, a choice of binary-decimal or sterling conversion is made and if sterling is chosen a "1" potential is applied to 25 in a suitable manner so that read-off is from track 4. If binary-decimal is chosen no potential is applied in 25 and read-off is then from 5. Clearly the switching potentials for 10 and 11 may be provided in any suitable known manner for example by means of a two position selector switch connected to a source of gate potentials. During the first minor cycle of a conversion, the inhibitor signal in 46 for 31, is effective, and as input 45 of 30 carries a gate pulse at the 36th digit, if the other input of 30 receives a "1" from the circulating store, a negative sign for the conversion is indicated and the bistable device 42 is triggered to implement the complementer 41. If 30 receives an 0 which represents a positive sign, the complementer is not implemented but simply forms a straight through path between its input and output. In the first minor cycle an indication is also communicated to the output printer for one is provided in the machine of the sign of the quantity about to be read out. During the second minor cycle 33 is inhibited whereas 31 is not, so that the output of circulating store 1 is communicated to one input of 34. The second input 50 of 34 carries inputs during the first three bit periods of this cycle so that these bits are communicated directly via the complementer to the printer. No conversion is required for the three bits of lowest significance as they carry equal weight either on sterling or binary-decimal scales.

During the next two minor cycles the third and fourth minor cycles, no corresponding equivalents are stored on the drum but a "1" on the auxiliary track coincides in time with the fourth bit location in the circulating store. If the fourth bit is a "1" a pulse output is produced by 35 which energises 37. The potential at the output of 37 now continues for a period of thirty-two bit periods before being inhibited by a clock pulse. The end of pulse gate 38 then passes a pulse and the bistable element 39 is energised, the time at this instant corresponding to the beginning of the readout from the first of the stored equivalents (i.e. $2^3$). Thus bits stored on the chosen equivalents track are transferred via the gate 36 to 13. At the end of 72 bit periods, 39 is de-energised by the output of 40 but during the read out of this equivalent a "1" is read from the auxiliary track to correspond in position in the second "word" of this equivalent with the bit location of $2^4$, to which the next equivalent which is to be read out corresponds. If the $2^4$ or the fifth bit location is occupied by a "1" the gate 30 passes a pulse and the equivalent is read out. If an "0" is stored in the fifth bit location however, no read out occurs. This process continues to the end of the word stored in 1 whereupon an inhibitor pulse is provided by 22 in 48 and 42 is de-energised in readiness for the conversion of a new serial binary word in 1.

In operation of the arrangement of FIGURE 1, during the first minor cycle, that is the first cycle of the store 1, by means of the device 2, the bit of greatest significance is read out to give the sign of the stored quantity and if a negative sign is recorded, the complementer is implemented and an indication that the quantity is negative sent to the printer which for simplicity is not indicated in the drawing since it forms no part of the invention. During the second minor cycle, the three bits of lowest significance as they have equal significance on either scale are transferred after complementing if required, directly to 13 and are therefore stored in 14.

Assuming the conversion is to sterling, a potential is applied to the point 25, so that read-out from the drum store is from the track 4 and is effected by 7. In addition, a setting is made in 22 to indicate that the conversion is sterling, in order that correct signals are applied by 22 to the switching units 19, 20 and 21. If the conversion is to decimal scale, no potential is applied to 25 so that read out is from the track 5 by reader 8.

Since there are seventy-two bits in each equivalent and thirty-six digits in the store 1, a period of two minor cycles is required for each equivalent to be read out. Considering subsequent minor cycles, in the minor cycle immediately previous to a pair of minor cycles constituting a particular equivalent, a "1" on the track 6 is read out in time coincidence with the position in 1 of the bit about to be converted. If this bit location carries a "1" it is instrumented by 2 that the equivalent is passed serially to 13 where it is added to the already accumulated quantity circulating in 14 and after a delay of 6 bit periods or one character period in 15, appears at one input to 23. If in the addition process no "carry" has occurred in 13, the appropriate "filler" is substracted in 23, but if however a "carry" has occurred it is indicated by an input to 16 from 13 so that the "filler" is inhibited by the gate 18 for that particular six digit "word" and no "filler" is subtracted in 23. If furthermore the bit location to be converted carries zero a pulse is applied in the lead 26 to 16 and the subtraction of the filler is again inhibited. There is clearly a possibility of eleven "carries" within the 12-character the period of read out of a single eqivalent.

As an illustrative example of the invention let it be assumed that a word stored in 1 is required to be converted to binary decimal form and that the word represents a number 123 thus the word stored in 1 is

0000 . . . 010000100

In the first minor cycle of the conversion the gate 31 is inhibited and the gate 30 is opened for the 36th bit location which in this case has a "1," so that the complementer is not implemented and remains so until the end of the conversion. As the store 1 commences a fresh minor cycle gates 31, 33 and 34 are opened and 30 is closed, 34 remains open for the period of the first three bits of the word stored in 1 that is 100 and therefore these bits are transferred directly to 13. Gate 34 then closes and 35 is not open during this minor cycle because there is no auxiliary signal read from the track 9 during this period. During the succeeding eight minor cycles gate 35 is not opened moreover because "0's" now appear at positions in 1 corresponding to which auxiliary signals are derived from 6 by 9. Considering however the eighth bit location in 1, during the twelfth minor cycle a bit "1" appears at the auxiliary track timed to coincide with read-out of the "1" from the store 1 and gate 25 is therefore opened. This enables the corresponding twelve character equivalents namely

. . . 000001000010001000 to be transferred to 13 where it is added to the three first digits to give

. . . 0000001000011000010 the higher significance bits which are all "0's" being omitted for convenience.

Had the bit location of highest significance in 1 contained a "1," the complementer would have been implemented and the complement of the binary quantity in 1 would then have been presesnted to the gate 33.

Although the above description of the invention has been made with reference to serial binary to binary decimal conversion, clearly the circuit in FIGURE 1 is operable for sterling conversion where the serial binary number represents pence. The respective fillers required are indicated in the rectangles representing six bit circulating registers associated with the selector switches 19, 20 and 21. These switches are selected by signals from the clock unit 22.

Although moreover the present embodiment of the invention has been described in the foregoing employing circulating registers, the invention is not limited to circulating registers since the invention may readily be adapted by persons skilled in the art to use with other types of storage device such for example as a magnetic core matrix store. In the case of a magnetic core matrix store, means would for example be provided for reading out successive rows of bits into a temporary register and thereafter gating the individual digits out to the gates 30 and 31 in FIGURE 3. Many other alternative arrangements can however be devised using the present invention.

Although furthermore the invention is described with equivalents to successive bits in locations in the store 1 stored along with the appropriate fillers on a magnetic drum store, the invention is not limited to the use of a drum store. Clearly, similarly to above, the drum store may substituted with any other suitable type of store such for example as a magnetic core matrix store.

What we claim is:

1. Apparatus for converting a serial binary coded number into another scale of notation in which characters are expressed in binary code, comprising a first register for signals representing said number, a second register for signals representing further numbers being equivalents of bits stored in said first register on said other scale of notation and to which a corresponding filler according to said scale of notation is added, means for deriving signals from said first register, gating means responsive to a first signal derived from said first register for selectively deriving second signals from said second register representing the equivalent with added filler corresponding to said first signal, a third register for signals derived from said second register, adding means for adding said second signals and the signals already stored in said third register with means for detecting the occurrence of a carry in said adding means, means for storing representations of said filler, and subtracting means responsive to said detection means for selectively subtracting the filler in the absence of a carry in a predetermined bit-position in said adder.

2. Apparatus according to claim 1, said third store comprising a circulating store, said adding means having an output lead for indicating carries and said means for subtracting said filler comprising switching means responsive to signals in said output lead for gating said filler to said subtracting means.

3. Apparatus according to claim 2, said third store comprising a circulating path including said adding means, and a delay means of one character delay period, and said subtracting means comprising a subtracting circuit also included in said path following said delay means, additional storage means for said fillers and gating means for gating said filler from said addition storage means to said subtracting circuit, whereby subtraction of said filler is inhibited for one character delay period in response to a carry signal produced by said adding means.

4. An arrangement according to claim 1, said second store comprising a magnetic drum store, said store comprising an auxiliary track whereon there are stored gating signals to coincide with regard to time of reading out with the bit in said first store the equivalent of which is next to be read out.

References Cited in the file of this patent

UNITED STATES PATENTS

| | | |
|---|---|---|
| 2,898,042 | Womersley et al. | Aug. 4, 1959 |

FOREIGN PATENTS

| | | |
|---|---|---|
| 745,907 | Great Britain | Mar. 7, 1956 |

OTHER REFERENCES

Bird: Computing Machines, Input and Output, Electronic Engineering (October 1953) (pp. 407 to 410).

Townsend: Serial Digital Adders for a Variable Radix of Notation, Electronic Engineering (October 1953) (pp. 410 to 416).